(12) United States Patent
Jung et al.

(10) Patent No.: US 7,846,588 B2
(45) Date of Patent: Dec. 7, 2010

(54) ELECTROLYTE FOR LITHIUM SECONDARY BATTERY AND LITHIUM SECONDARY BATTERY COMPRISING SAME

(75) Inventors: Cheol-Soo Jung, Suwon-si (KR); Bo-Geum Choi, Suwon-si (KR); Eui-Hwan Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1518 days.

(21) Appl. No.: 11/174,075

(22) Filed: Jun. 30, 2005

(65) Prior Publication Data

US 2006/0003232 A1 Jan. 5, 2006

(30) Foreign Application Priority Data

| Jun. 30, 2004 | (KR) | ................ 10-2004-0050905 |
| Jun. 30, 2004 | (KR) | ................ 10-2004-0050906 |
| Jun. 30, 2004 | (KR) | ................ 10-2004-0050907 |

(51) Int. Cl.
*H01M 6/16* (2006.01)

(52) U.S. Cl. ............... 429/330; 429/331; 429/332; 429/231.1; 429/231.3; 429/217; 429/231.8; 429/231.4; 429/232

(58) Field of Classification Search ........... 429/330, 429/331, 332, 231.1, 231.3, 217, 231.8, 231.4, 429/232
See application file for complete search history.

(56) References Cited

U.S. PATENT DOCUMENTS

| 4,737,424 | A | | 4/1988 | Tobishima et al. |
| 5,079,109 | A | | 1/1992 | Takami et al. |
| 5,272,022 | A | | 12/1993 | Takami et al. |
| 5,521,027 | A | | 5/1996 | Okuno et al. |
| 5,552,243 | A | | 9/1996 | Klein |
| 5,707,763 | A | * | 1/1998 | Shimizu et al. ............ 429/217 |
| 5,851,693 | A | | 12/1998 | Sano et al. |
| 6,045,951 | A | * | 4/2000 | Wendsjo et al. ............ 429/330 |
| 6,117,596 | A | | 9/2000 | Lee et al. |
| 6,521,380 | B1 | | 2/2003 | Ryu et al. |
| 6,929,885 | B2 | * | 8/2005 | Kotato et al. ............... 429/331 |
| 7,223,500 | B2 | * | 5/2007 | Noh et al. .................. 429/331 |
| 7,226,704 | B2 | | 6/2007 | Panitz et al. |
| 7,229,718 | B2 | | 6/2007 | Yamaguchi et al. |
| 2003/0118904 | A1 | | 6/2003 | Hosokawa et al. |
| 2004/0013946 | A1 | | 1/2004 | Abe et al. |
| 2004/0106047 | A1 | | 6/2004 | Mie et al. |
| 2005/0084765 | A1 | * | 4/2005 | Lee et al. .................. 429/330 |
| 2006/0003232 | A1 | | 1/2006 | Jung et al. |

FOREIGN PATENT DOCUMENTS

| CN | 1151619 A | 6/1997 |
| CN | 1263363 | 8/2000 |
| CN | 1274956 | 11/2000 |
| CN | 1317843 A | 10/2001 |
| CN | 1497765 A | 5/2004 |
| EP | 0478 379 A2 | 4/1992 |
| EP | 0478 379 A3 | 4/1992 |
| EP | 1 146 587 A2 | 10/2001 |
| EP | 0 757 399 B1 | 4/2003 |
| EP | 1 406 336 | 4/2004 |
| EP | 1 146 587 A3 | 4/2005 |
| JP | 52-71630 | 6/1977 |
| JP | 4-206167 | 7/1992 |
| JP | 5-144470 | 6/1993 |
| JP | 6-20721 A | 1/1994 |
| JP | 7-320748 | 12/1995 |
| JP | 9-73919 A | 3/1997 |
| JP | 9-97626 A | 4/1997 |
| JP | 10-189043 | 7/1998 |
| JP | 10-312825 A | 11/1998 |
| JP | 11-040199 | 2/1999 |
| JP | 2000-124077 | 4/2000 |
| JP | 2000-235868 | 8/2000 |
| JP | 2001-126761 | 5/2001 |
| JP | 2001-167797 | 6/2001 |
| JP | 2002-83630 A | 3/2002 |
| JP | 2002-134101 | 5/2002 |
| JP | 2002-203561 | 7/2002 |
| JP | 2002-343430 A | 11/2002 |

(Continued)

OTHER PUBLICATIONS

Patent Abstracts of Japan, Publication No. 2002-134101; Date of Publication: May 10, 2002; in the name of Tatsuya Hashimoto et al.

(Continued)

*Primary Examiner*—Laura S Weiner
(74) *Attorney, Agent, or Firm*—Christie, Parker & Hale, LLP

(57) ABSTRACT

An electrolyte for a lithium secondary battery is provided. The electrolyte improves battery safety, high temperature storage characteristics, and electrochemical properties of lithium batteries. The electrolyte comprises at least one lithium salt and a non-aqueous organic solvent comprising a cyclic carbonate and a lactone-based compound. The lactone based compound comprises substituents selected from the group consisting of alkyl groups, alkenyl groups, alkynyl groups, aryl groups, and combinations thereof. A lithium battery is also provided, which comprises a negative electrode capable of intercalating/deintercalating lithium, a positive electrode capable of intercalating/deintercalating lithium, and an inventive electrolyte.

37 Claims, 2 Drawing Sheets

FOREIGN PATENT DOCUMENTS

| | | | |
|---|---|---|---|
| JP | 2003-7333 A | 1/2003 | |
| JP | 2003-07336 | 1/2003 | |
| JP | 2003-086247 | 3/2003 | |
| JP | 2003-510792 A | 3/2003 | |
| KR | 1999-0053023 | 7/1999 | |
| KR | 2001-0006825 | 1/2001 | |
| KR | 10-2003-0079310 A | 10/2003 | |
| KR | 10-2004-0038679 | 5/2004 | |
| KR | 10-2006-0001742 | 1/2006 | |
| KR | 10-2006-0001744 | 1/2006 | |
| WO | WO 02/071528 A2 | 9/2002 | |
| WO | WO 02/071528 A3 | 9/2002 | |
| WO | WO 03/079381 | 9/2003 | |
| WO | WO 2004/023577 A2 | 3/2004 | |
| WO | WO 2004/023577 A3 | 3/2004 | |

OTHER PUBLICATIONS

Patent Abstracts of Japan, Publication No. 2002-203561; Date of Publication: Jul. 19, 2002; in the name of Tetsuo Seto et al.

Patent Abstracts of Japan, Publication No. 2001-126761; Publication Date: May 11, 2001; in the name of Kotado et al.

Patent Abstracts of Japan, Publication No. 2001-167797; Publication Date: Jun. 22, 2001; in the name of Shibuya et al.

Patent Abstracts of Japan for publication No. 10189043 of Jul. 21, 1998, in the name of J. Arai et al.

Patent Abstracts of Japan for publication No. 11-040199 of Feb. 12, 1999, in the name of H. Katayama et al.

Korean Patent Abstracts for publication No. 10-2003-0079310 A of Oct. 10, 2003, in the name of Jun-Ho Kim et al.

Korean Patent Abstracts, Publication No. 1020040038679 A, dated May 8, 2004, in the name of Akio Hiwara et al.

U.S. Office action dated Dec. 29, 2008, for related U.S. Appl. No. 10/924,248, noting U.S. Patent 7,229,718, EP 1 406 336 and WO 03/079381, listed in this IDS.

U.S. Office action dated Dec. 29, 2008, for related U.S. Appl. No. 10/924,248, noting U.S. Patent 4,737,424 and U.S. Publication 2004/0013946 listed in this IDS.

U.S. Notice of Allowance dated Jul. 10, 2009, for related U.S. Appl. No. 10/924,248.

Takami, et al, *New thin lithium-ion batteries using a liquid electrolyte with thermal stability*, Journal of Power Sources, 97-98, (2001), pp. 677-680.

European Search Report dated Jan. 10, 2005, European application 04090320.5.

* cited by examiner

ELECTROLYTE FOR LITHIUM SECONDARY BATTERY AND LITHIUM SECONDARY BATTERY COMPRISING SAME

CROSS-REFERENCES TO RELATED APPLICATION

This application claims priority to and the benefit of Korean Patent Application Nos. 10-2004-0050905, 10-2004-0050906, and 10-2004-0050907 all filed on Jun. 30, 2004 in the Korean Intellectual Property Office, the entire contents of which are incorporated herein by reference.

FIELD OF THE INVENTION

The present invention relates to an electrolyte for a lithium secondary battery and a lithium secondary battery comprising the same. More particularly, the invention relates to an electrolyte for a lithium secondary battery having good safety characteristics, good storage characteristics at a high temperature, and good electrochemical properties.

BACKGROUND OF THE INVENTION

Generally, lithium secondary batteries comprising non-aqueous electrolytes generate high voltages, have high energy densities, good storage characteristics and good operability at low temperatures. These batteries are therefore widely used in personal, portable electronic devices. Active research has been conducted into batteries having capacities sufficient for application as energy storage devices for electric vehicles or nighttime electricity. Thin batteries having high capacities have recently been required, thereby increasing the demand for polymer batteries and laminated thin lithium secondary batteries.

Since most conventional solvents have low flash points and are highly flammable, they may cause fire, explosion, etc. In order to ensure safety, many alternative electrolytes have been suggested. For example, Japanese Patent Laid-open No. H10-189043 discloses a non-aqueous electrolyte which includes a halogenated carbonate. This electrolyte is said to reduce the risk of combustion, to perform well at both high and low temperatures, and to impart good cycle-life characteristics.

Japanese Patent Laid-Open No. H11-40199 also discloses a non-aqueous electrolyte including a halogenated carbonate. This electrolyte is said enable the battery to operate a safety valve upon increases in internal pressure, thereby ensuring the safety of the battery.

However, lithium secondary batteries having non-aqueous electrolytes which include halogenated carbonates cause films to form on the surfaces of the negative electrodes, which films decompose to generate a gas. This generated gas remarkably increases the internal pressure of the battery when stored around 60° C. for several days. This presents a particularly serious problem in polymer batteries and laminated thin lithium secondary batteries, since the generated gas increases battery thickness.

In addition, in polymer batteries and laminated thin lithium secondary batteries, overcharging the battery causes excessive expansion of the battery. This excessive expansion repeatedly creates internal short circuits. In particular, when the battery is overcharged by a large current from a discharged state, internal short circuits easily occur due to lithium deposition, making it difficult to ensure the safety of the battery.

A method has been suggested for improving battery safety which uses a non-aqueous electrolyte which includes propylene carbonate or gamma butyrolactone and which has a high ignition point or heat of combustion. However, because the negative passivation film formed from the propylene carbonate or gamma butyrolactone is brittle, the electrolyte cannot ensure good cycle life characteristics. Additionally, the electrolyte induces battery swelling, thereby decreasing reliability.

SUMMARY OF THE INVENTION

In one embodiment of the present invention, an electrolyte is provided which improves battery safety, high temperature storage characteristics and the electrochemical properties of the lithium battery. The lithium secondary battery according to this embodiment generally comprises a negative electrode capable of intercalating/deintercalating lithium, a positive electrode capable of intercalating/deintercalating lithium, and an electrolyte comprising a lithium salt and a non-aqueous organic solvent comprising a cyclic carbonate, a lactone-based compound. The lactone-based compound comprises substituents selected from the group consisting of alkyl groups, alkenyl groups, alkynyl groups, aryl groups, and combinations thereof.

According to another embodiment, the electrolyte comprises at least two lithium salts and a non-aqueous organic solvent comprising a cyclic carbonate, a lactone-based compound, an ester compound having an electron withdrawing group. One of the lithium salts is lithium tetrafluoroborate ($LiBF_4$). The lactone-based compound comprises substituents selected from the group consisting of alkyl groups, alkenyl groups, alkynyl groups, aryl groups, and combinations thereof.

In yet another embodiment, the electrolyte comprises lithium salts, a gel-forming compound and a non-aqueous organic solvent comprising a cyclic carbonate and a lactone-based compound. The lactone-based compound comprises substituents selected from the group consisting of alkyl groups, alkenyl groups, alkynyl groups, aryl groups, and combinations thereof.

BRIEF DESCRIPTION OF THE DRAWINGS

The invention, and many of its attendant advantages, will be better understood by reference to the following detailed description when considered in conjunction with the accompanying drawings, wherein.

DETAILED DESCRIPTION OF THE INVENTION

Figure 1:
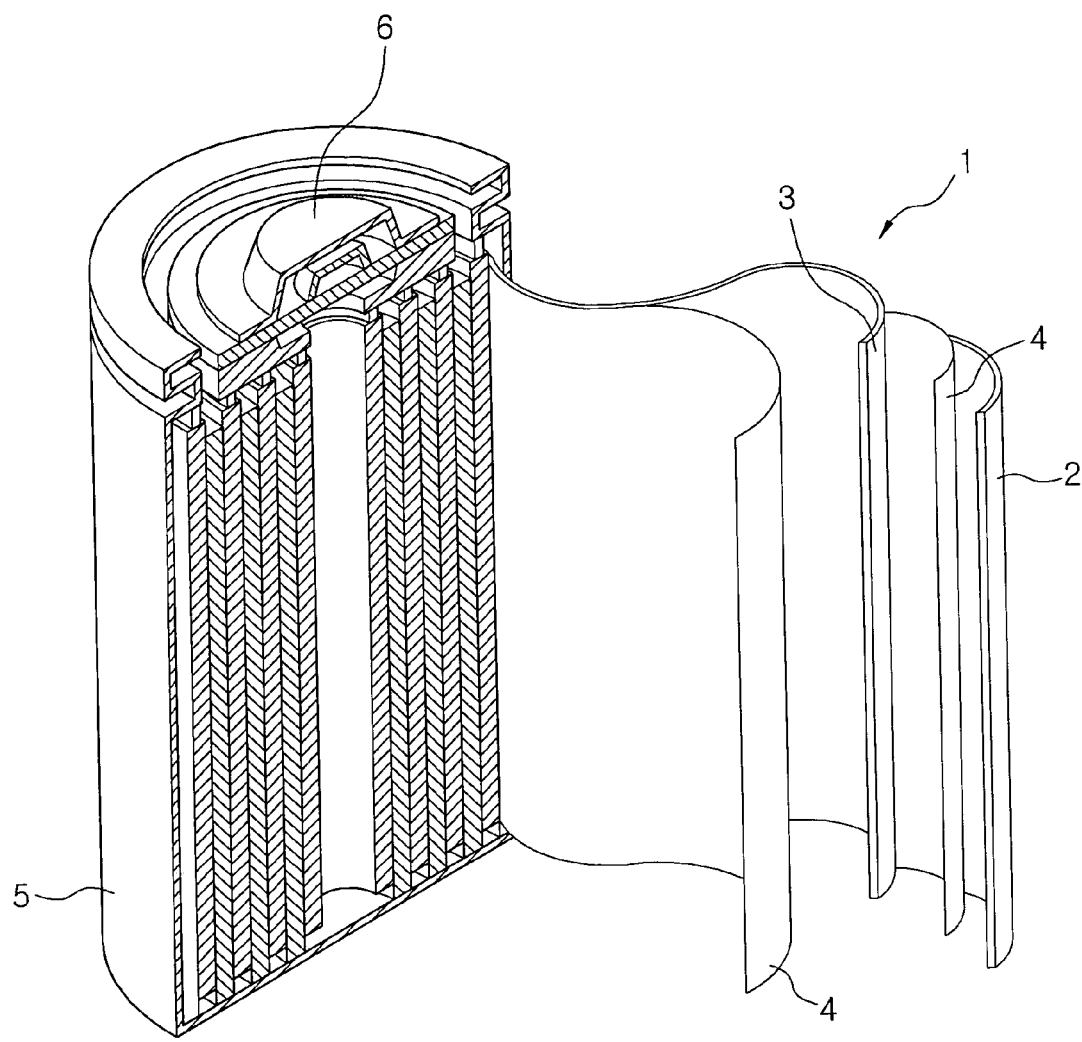
FIG. 1 is an exploded perspective view of a lithium secondary battery according to one embodiment of the present invention.

In the following detailed description, exemplary embodiments of the invention are described and illustrated in the accompanying drawings. As will be realized, the invention is capable of various modifications without departing from the principal and spirit of the invention. Accordingly, the description and drawings are illustrative, and not restrictive.

A lithium secondary battery according to one embodiment of the present invention comprises a negative electrode capable of intercalating/deintercalating lithium, a positive electrode capable of intercalating/deintercalating lithium, and an electrolyte. At least one of the positive and negative electrodes comprises an active material, a water-soluble polymer binder, and a water-soluble thickener.

The active material may comprise any material capable of reversibly intercalating and deintercalating lithium. The positive active material may comprise at least one composite oxide including lithium and at least one element selected from the group consisting of cobalt, manganese, and nickel. For example, the positive active material may comprise a lithium compound represented by one of formulas (1) through (14) below.

$$Li_xMn_{1-y}M_yA_2 \quad (1);$$

$$Li_xMn_{1-y}M_yO_{2-z}X_z \quad (2);$$

$$Li_xMn_2O_{4-z}X_z \quad (3);$$

$$Li_xMn_{2-y}M_yM'zA_4 \quad (4);$$

$$Li_xCo_{1-y}M_yA_2 \quad (5);$$

$$Li_xCo_{1-y}M_yO_{2-z}X_z \quad (6);$$

$$Li_xNi_{1-y}M_yA_2 \quad (7);$$

$$Li_xNi_{1-y}M_yO_{2-z}X_z \quad (8);$$

$$Li_xNi_{1-y}Co_yO_{2-z}X_z \quad (9);$$

$$Li_xNi_{1-y-z}Co_yM_zA_\alpha \quad (10);$$

$$Li_xNi_{1-y-z}Co_yM_zO_{2-\alpha}X_\alpha \quad (11);$$

$$Li_xNi_{1-y-z}Mn_yM_zA_\alpha \quad (12);$$

$$Li_xNi_{1-y-z}Mn_yM_zO_{2-\alpha}X_\alpha \quad (13); \text{ and}$$

$$Li_xMn_{2-y-z}M_yM'_zA_4 \quad (14),$$

wherein $0.9 \leq x \leq 1.1$, $0 \leq y \leq 0.5$, $0 \leq z \leq 0.5$, and $0 \leq \alpha \leq 2$;

M and M' may be identical to or different from each other, and M and M' are each selected from the group consisting of Mg, Al, Co, K, Na, Ca, Si, Ti, Sn, V, Ge, Ga, B, As, Zr, Ni, Mn, Cr, Fe, Sr, V, and rare earth elements;

A is selected from the group consisting of O, F, S, and P; and

X is selected from the group consisting of F, S, and P.

The positive active material may further comprise a compound capable of intercalating/deintercalating lithium such as $LiFeO_2$, $V_2O_5$, TiS, MoS, an organo disulfide compound, or an organo polysulfide compound.

The negative active material may include carbonaceous materials such as artificial graphite, natural graphite, graphitized carbon fiber, graphitized mesocarbon microbeads, fullerene, amorphous carbon and mixtures thereof. In one embodiment, the carbonaceous material has a d002 interplanar distance ranging from about 3.35 to about 3.38 Å, an Lc (crystallite size) measured by X-ray diffraction of greater than about 20 nm, and an exothermic peak of at least about 700° C. The negative active material may also comprise a metal capable of alloying with lithium, and a mixed material comprising the carbonaceous material and the alloying metal. Nonlimiting examples of metals capable of alloying with lithium include Al, Si, Sn, Pb, Zn, Bi, In, Mg, Ga, Cd, Ge, and similar metals.

Exemplary water-soluble polymer binders include non-fluoro-based organic polymers having a butadiene group. Suitable organic polymers include styrene-butadiene rubber (SBR), carboxy modified styrene-butadiene rubber (SBR), acrylonitrile-butadiene rubber (NBR), acrylate-butadiene rubber, and the like. Other suitable organic polymers include sodium polyacrylate, copolymers of propylene and olefin having from 2 to 8 carbon atoms, copolymers of (meth) acrylic acid and alkyl (meth)acrylate.

In addition to the water-soluble polymer binder, a water-soluble thickener is also added to the active material in order to improve binding properties. The water-soluble thickener may include a cellulose-based compound such as carboxymethyl cellulose-alkali metal salt, hydroxypropylmethyl cellulose-alkali metal salt, or methyl cellulose-alkali metal salt, and so on. The alkali metal in the cellulose-alkali metal salt is selected from the group consisting of Na, K, or Li. The cellulose-alkali metal salt prevents reduction of both the electron conduction path and the ionic conduction path. The cellulose-alkali metal salt also prevents increases in the internal resistance of the battery. In the absence of an alkali metal salt, such increases in the internal resistance of the battery would occur due to the use of the non-conductive material of the cellulose compound and a water soluble binder. Prevention of the increase in the internal resistance of the battery is important because such an increases results in the rapid deterioration of the discharge characteristics.

The water-soluble thickener may be selected from the group consisting of polyvinylalcohol, polyvinylpyrrolidone, polyacrylic acid, polymethacrylic acid, polyethyleneoxide, polyacrylamide, poly-N-isopropylacrylamide, poly-N,N-dimethylacrylamide, polyethyleneimine, polyoxyethylene, poly(2-methoxyethoxyethylene), poly(3-morphinylethylene), polyvinylsulfonic acid, polyvinylidene fluoride, amylose, poly(acrylamide-co-diallyldimethyl ammonium chloride).

In one embodiment of the present invention, the water-soluble polymer binder is present in an amount ranging from about 0.5 to about 10 wt % based on the sum (or "active mass") of the total weight of the active material and binder. When the amount of the binder is less than about 0.5 wt %, the amount of the binder is not sufficient and the physical properties of the electrode deteriorate, resulting in detachment of the active material from the electrode. When the amount of the binder is more than about 10 wt %, the concentration of active material decreases, resulting in reduced battery capacity.

In one embodiment, the water-soluble thickener is present in an amount ranging from about 0.1 to about 10 wt % based on the active mass. When the water-soluble thickener is present in an amount less than about 0.1 wt %, the viscosity of the active material composition is too low, making it difficult to coat the active material composition. When the thickener is present in an amount more than about 10 wt %, the viscosity is too high to coat the active material composition.

The positive electrode and negative electrode of the present invention may also comprise an electro-conductive agent. The negative electrode may also comprise a conductive agent. Examples of conductive agents include nickel powder, cobalt oxide, titanium oxide, and carbon. Examples of suitable carbon materials include ketjen black, acetylene black, furnace black, denka black, graphite, carbon fiber, fullerene, and similar materials.

The positive and negative electrodes according to one embodiment of the present invention are fabricated by first preparing a slurry comprising active material powder, water, a water-soluble polymer binder, and a water-soluble thickener. Then, the slurry is coated onto a metal current collector, dried, and compressed. Alternatively, the electrodes are fabricated by dipping a current collector in the slurry, and then drying and compressing the collector. The electrodes are generally sheet shaped, but may also be cylindrical, disk-shaped, plate-shaped, or rod-shaped.

Unlike conventional organic solvent-based dispersion liquids, the aqueous dispersion liquid according to the present invention, in which the water-soluble binder and water-soluble thickener are dispersed do not require special equipment to treat the organic solvent. The inclusion of the water-soluble binder and water-soluble thickener therefore reduce production cost and are environmentally friendly. In addition, the water-soluble binder and water-soluble thickener provide a carbonaceous powder, such as graphite, and create a negative active material with good binding properties.

According to another embodiment of the present invention, a lithium secondary battery is provided which comprises the above described positive and negative electrodes. The lithium secondary battery generally comprises a positive electrode, a negative electrode, and an electrolyte. The battery may further comprise a separator as needed. The separator may comprise any material used in conventional lithium secondary batteries. Nonlimiting examples of suitable separator materials include polyethylene, polypropylene, and multilayers thereof. Other suitable nonlimiting examples of separator materials include polyvinylidene fluoride, polyamide, glass fiber, and the like.

According to one embodiment of the present invention, an electrolyte of a lithium secondary battery comprises lithium salts and a non-aqueous, organic solvent comprising a cyclic carbonate, a lactone-based compound. The lactone-based compound comprises substituents selected from the group consisting of alkyl groups, alkenyl groups, alkynyl groups, aryl groups, and combinations thereof.

In another embodiment of the present invention, an electrolyte of a lithium secondary battery comprises an ester compound having an electron withdrawing group, at least two lithium salts and a non-aqueous, organic solvent comprising a cyclic carbonate and a lactone-based compound. One of the lithium salts comprises lithium tetrafluoroborate. The lactone-based compound comprises substituents selected from the group consisting of alkyl groups, alkenyl groups, alkynyl groups, aryl groups, and combinations thereof.

According to yet another embodiment of the present invention, an electrolyte of a lithium secondary battery comprises a lithium salt, a gel-forming compound and a non-aqueous, organic solvent comprising a cyclic carbonate and a lactone-based compound. The lactone-based compound comprises substituents selected from the group consisting of alkyl groups, alkenyl groups, alkynyl groups, aryl groups, and combinations thereof.

In each of the above described electrolytes, the cyclic carbonate is selected from the group consisting of ethylene carbonate, propylene carbonate, vinylene carbonate, butylene carbonate, and mixtures thereof. Preferably, the cyclic carbonate comprises ethylene carbonate. In one embodiment, lithium ions are dissolved in the cyclic carbonate(s), thereby increasing ionic conductivity of the electrolyte.

The cyclic carbonate is present in the electrolyte in an amount of less than or equal to 50 volume % based on the non-aqueous organic solvent. Preferably the cyclic carbonate is present in an amount ranging from about 5 volume % to about 30 volume % based on the non-aqueous organic solvent. More preferably, the cyclic carbonate is present in an amount ranging from about 5 volume % to about 20 volume % based on the non-aqueous organic solvent. Still more preferably, the cyclic carbonate is present in an amount ranging from about 5 volume % to about 15 volume % based on the non-aqueous organic solvent.

The lactone-based compound comprises a lactone-based cyclic compound comprising substituents selected from the group consisting of alkyl groups, alkenyl groups, alkynyl groups, aryl groups, and combinations thereof. According to one embodiment of the present invention, the lactone-based compound comprises compounds represented by the following formulas (15) to (17):

(15)

(16)

(17)

wherein R is selected from the group consisting of alkyl groups, alkenyl groups, alkynyl groups, aryl groups, and combinations thereof.

Nonlimiting examples of the lactone-based compound include beta-butyrolactone, gamma-valerolactone, gamma-caprolactone, gamma-heptanolactone, gamma-octanolactone, gamma-nonalactone, gamma-decanolactone, delta-caprolactone, delta-heptanolactone, delta-octanolactone, delta-nonalactone, delta-decanolactone, delta-dodecanolactone, and the like. Preferably, the lactone-based compound is selected from the group consisting of gamma-octanolactone and gamma-valerolactone.

The lactone-based compound is present in the electrolyte in an amount ranging from about 0.1 to about 80 volume % based on the non-aqueous organic solvent. Preferably, the lactone-based compound is present in an amount ranging from about 0.1 to about 60 volume % based on the non-aqueous organic solvent. More preferably, the lactone-based compound is present in an amount ranging from about 0.1 to about 10 volume % based on the non-aqueous organic solvent. Still more preferably, the lactone-based compound is present in an amount ranging from about 0.5 to about 10 volume % based on the non-aqueous organic solvent. When the lactone-based compound is present in the electrolyte within these ranges, battery performance is improved.

In another embodiment of the present invention, the electrolyte further comprises a low-viscosity solvent. The low-viscosity solvent is present in the electrolyte in an amount ranging from about 1 volume % to about 50 volume % based on the non-aqueous organic solvent. As used, the term "low viscosity" refers to a solvent having a viscosity less than about 1 cps. The low viscosity solvent is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), tetrahydrofuran, 2-methyl tetrahydrofuran, 1,4-dioxane, 1,2-dimethoxyethane, 1,2-diethoxyethane, acetonitrile, methyl propionate, dimethyl formamide, fluoroethers (fluorinated ethers), and combinations thereof. Nonlimiting examples of suitable fluoroethers include $HCF_2(CF_2)_3CH_2OCF_2CF_2H$, $CF_3CF_2CH_2OCF_2CFHCF_3$, $HCF_2CF_2CH_2OCF_2CF_2H$, $HCF_2CF_2CH_2OCF_2CFHCF_3$, $HCF_2(CF_2)_3CH_2OCF_2CFHCF_3$, and combinations thereof.

In an exemplary embodiment of the present invention, the cyclic carbonate and the lactone-based compound comprise from about 40 to about 85 volume % of the electrolyte. The electrolyte also comprises from about 15 to about 60 volume % of a linear carbonate. The cyclic carbonate may comprise ethylene carbonate, propylene carbonate, vinylene carbonate, butylene carbonate, or mixtures thereof. Preferably, the cyclic carbonate comprises ethylene carbonate. The linear carbonate may comprise dimethyl carbonate (DMC), diethyl carbonate (DEC), dipropyl carbonate (DPC), methylpropyl carbonate (MPC), ethylpropyl carbonate (EPC), methylethyl carbonate (MEC), and mixtures thereof.

In another exemplary embodiment of the present invention, the electrolyte comprises a lithium salt and an organic solvent comprising a cyclic carbonate, a lactone-based organic solvent, a lactone-based compound. The lactone-based compound comprises substituents selected from the group consisting of alkyl groups, alkenyl groups, alkynyl groups, aryl groups, and combinations thereof.

In yet another embodiment, the electrolyte further comprises an unsubstituted lactone-based compound. The unsubstituted lactone-based compound is present in the electrolyte in an amount of about 1 volume % to about 60 volume % based on the non-aqueous organic solvent. Nonlimiting examples of suitable unsubstituted lactone-based compounds include β-propiolactone, γ-butyrolactone, δ-valerolactone, ∈-caprolactone and the like.

Nonlimiting examples of suitable lithium salts (solute) include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are rational numbers), LiCl, LiI, and mixtures thereof. In addition, any lithium salt used as a solute in a conventional lithium secondary battery may also be used. The lithium salt preferably comprises a salt selected from the group consisting of $LiPF_6$ and $LiBF_4$. The concentration of the lithium salt ranges from about 0.1 mol/L and about 2.0 mol/L. Preferably, the concentration of the lithium salt ranges from about 0.1 mol/L and 1.5 mol/L.

According to one embodiment of the present invention, the flammability of the electrolyte is decreased, thereby increasing battery safety. The lactone-based compound forms a passivation film on the surface of the negative electrode. This passivation film prevents decomposition of the organic solvent and improves cycle-life characteristics of the lithium secondary battery. The passivation film of the negative electrode has good durability and does not decompose at high temperatures, thereby preventing gas generation. Compared to conventional non-aqueous electrolytes comprising carbonate-based solvents, the electrolyte according to this embodiment exhibits significantly improved storage properties at high temperatures.

According to another embodiment of the present invention, the electrolyte comprises an ester compound having an electron withdrawing group, at least two lithium salts and a non-aqueous organic solvent comprising a cyclic carbonate and a lactone-based compound. The lactone-based compound comprises substituents selected from the group consisting of alkyl groups, alkenyl groups, alkynyl groups, aryl groups, and combinations thereof. One of the lithium salts comprises lithium tetrafluoroborate.

According to this embodiment, the lithium tetrafluoroborate ($LiBF_4$) forms a passivation film on the negative electrode. The concentration of $LiBF_4$ ranges from about 0.001 mol/L to about 1 mol/L. When the concentration of $LiBF_4$ is less than about 0.001 mol/L, it is difficult to prevent decomposition of the passivation film at high temperatures. When the concentration of $LiBF_4$ is more than about 1 mol/L, cycle characteristics deteriorate.

In this embodiment of the present invention, the flammability of the electrolyte is also decreased, thereby improving battery safety. The lactone-based compound forms a passivation film on the surface of the negative electrode. This passivation film prevents decomposition of the organic solvent and improves cycle-life characteristics of the lithium secondary battery. The passivation film of the negative electrode has good durability and does not decompose at high temperatures, thereby preventing gas generation. Compared to conventional non-aqueous electrolytes comprising carbonate-based solvents, the electrolyte according to this embodiment has significantly improved storage properties at high temperatures. The $LiBF_4$ modifies the passivation film on the negative electrode, and significantly prevents decomposition of the passivation film at high temperatures, thereby preventing gas generation. Additionally, the passivation film prevents abrupt gas generation upon overcharging, thus preventing internal short circuits which can result from the modification of laminated batteries due to swelling. As a result, the passivation film significantly improves battery safety.

According to another embodiment of the present invention, an electrolyte comprises a lithium salt, a gel-forming compound and a non-aqueous organic solvent comprising a cyclic carbonate and a lactone-based compound. The lactone-based compound comprises substituents selected from the group consisting of alkyl groups, alkenyl groups, alkynyl groups, aryl groups, and combinations thereof.

The gel-forming compound supports the non-aqueous electrolyte and forms a gel electrolyte. The gel electrolyte prevents gas generation at high storage temperatures.

Nonlimiting examples of suitable gel-forming compounds include polyacrylates having two or more functional groups, such as polyethylene glycol dimethacrylate and polyethylene glycol acrylate. These gel-forming compounds are radical-polymerized by heating to generate polymers. The compound and concentration of the gel-forming compound may vary and are selected to obtain the desirable gel electrolyte. Specific, nonlimiting examples of suitable gel-forming compounds include polyethylene oxide (PEO), polypropylene oxide (PPO), polyacrylonitrile (PAN), polyvinylidene fluoride (PVDF), polymethacrylate (PMA), polymethylmethacrylate (PMMA), and polymers thereof. Alternatively, the gel-forming compound may comprise a poly(ester)(meth)acrylate in which all or a part of the hydroxide groups (—OH) of (polyether) polyol having three or more hydroxide groups (—OH) are substituted with a (meth)acrylic acid ester. The remaining hydroxides (—OH), which are not substituted with (meth)acrylic acid ester are substituted with a non-reactive radical group. The poly(ester)(meth)acrylate can be prepared by the method disclosed in Korean Patent Application No. 2002-0018264, the entire content of which is incorporated herein by reference.

The gel-forming compound is present in the electrolyte in an amount ranging from about 0.3 to about 10 wt % based on the total weight of the electrolyte. When the gel-forming compound is present in an amount less than about 0.3 wt %, a gel electrolyte is difficult to form. When the gel-forming compound is present in an amount more than about 10 wt %, cycle-life deteriorates.

The electrolyte according to this embodiment of the present invention may further comprise an organic peroxide. The organic peroxide further improves inhibition of swelling at high temperatures by polymerization of the gelling compound when the internal temperature of the battery increases.

The organic peroxide may have a polar region (hydrophilic part) comprising —C(=O)—O—O—C(=O)—, and a nonpolar region (hydrophobic part) comprising an aliphatic or aromatic hydrocarbon group having from 6 to 40 carbon atoms. As the peroxide acts as a surfactant between the electrolyte and the negative electrode, particularly a carbonaceous negative electrode, resistance between the negative electrode and the electrolyte is decreased to inhibit decomposition of the electrolyte on the surface of the negative electrode.

The organic peroxide preferably comprises a $C_6$-$C_{40}$ organic peroxide. Nonlimiting examples of suitable organic peroxides include isobutyl peroxide, lauroyl peroxide, benzoyl peroxide, m-toluoyl peroxide, t-butyl peroxy-2-ethyl hexanoate, t-butyl peroxy bivarate, t-butyloxyneodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexylperoxy dicarbonate, and 3,3,5-trimethylhexanoyl peroxide.

According to this embodiment of the present invention, the flammability of the electrolyte is also decreased, thereby increasing battery safety. The lactone-based compound forms a passivation film on the surface of the negative electrode. This passivation film prevents decomposition of the organic solvent and improves cycle-life characteristics of the lithium secondary battery. The passivation film of the negative electrode has good durability and does not decompose at high temperatures, thereby preventing gas generation. Compared to conventional non-aqueous electrolytes comprising carbonate-based solvents, the electrolyte according to this embodiment has significantly improved storage properties at high temperatures.

The dielectric constant of the electrolyte, measured at 20° C., ranges from about 5 to about 80, preferably from about 15 to about 60. If the electrolyte has a very low dielectric constant, the lithium ions are dissociated and transmitted upon charge and discharge so that there are not enough lithium ions to allow the battery to perform effectively.

In any of the above embodiments of the present invention, the electrolyte may further include an ester compound having an electron withdrawing group. The ester compound may comprise a cyclic ester compound. In one embodiment, the cyclic ester compound comprises an ethylene carbonate derivative of the following formula (18):

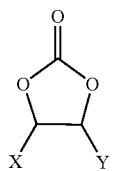

(18)

wherein X and Y each comprise an electron withdrawing group; and at least one of X and Y comprises an electron withdrawing group selected from the group consisting of hydrogen, halogen, cyano (CN), and nitro ($NO_2$).

Nonlimiting examples of suitable ethylene carbonate derivatives include fluoroethylenecarbonate, difluoroethylenecarbonate, fluoropropylenecarbonate, difluoropropylenecarbonate, trifluoropropylenecarbonate, fluorogammabutyrolactone, difluorogammabutyrolactone, chloroethylenecarbonate, dichloroethylenecarbonate, chloropropylenecarbonate, dichloropropylenecarbonate, trichloropropylenecarbonate, chlorogammabutyrolactone, dichlorogammabutyrolactone, bromoethylenecarbonate, dibromoethylenecarbonate, bromopropylenecarbonate, dibromopropylenecarbonate, tribromopropylenecarbonate, bromogammabutyrolactone, dibromogammabutyrolactone, nitroethylenecarbonate, nitropropylenecarbonate, nitrogammabutyrolactone, cyanoethylenecarbonate, cyanopropylenecarbonate, cyanogammabutyrolactone, and the like.

The ester compound having an electron withdrawing group is present in the electrolyte in an amount ranging from about 0.1 wt % to about 25 wt % based on the total weight of the electrolyte. Preferably, the ester compound is present in an amount ranging from about 0.5 wt % to about 10 wt % based on the total weight of the electrolyte. When the ester compound is present in an amount less than about 0.1 wt %, the ability to inhibit gas generation is reduced. When the ester compound is present in an amount more than about 25 wt %, the conductive film is too thick, thereby damaging battery reversibility and deteriorating battery performance and cycle-life characteristics.

A lithium secondary battery according to one embodiment of the present invention comprises negative and positive electrodes and an electrolyte situated within a battery case. The battery may also comprise a separator as needed. FIG. 1 is an exploded perspective view showing one example of a lithium secondary battery according to this embodiment. As shown, a lithium secondary battery 1 comprises a negative electrode 2, a positive electrode 3, a separator 4 separating the negative electrode 2 and the positive electrode 3, an electrolyte between the positive electrode 3 and negative electrode 2, a cylindrical container 5, and a sealing member 6 for sealing the container 5. Such a lithium secondary battery 1 is fabricated by first laminating the negative electrode 2, the positive electrode 3, and the separator 4. The laminated electrodes and separator are then spiral-wound to fabricate an electrode assembly. The assembly is then situated within the battery container 5. FIG. 1 illustrates the structure of a cylindrical battery according to one embodiment of the present invention. However, it is understood that the invention is not limited this structure, but rather can be any suitable shape such as a prism or pouch.

The following examples illustrate the present invention in further detail. However, it is understood that the present invention is not limited by these examples.

EXAMPLES AND COMPARATIVE EXAMPLES

Fabrication of Lithium Secondary Batteries

Table 1 lists the compositions of Examples 1 to 15 and Comparative Examples 1 to 3. The electrolytes of the respective Examples or Comparative Examples were prepared according to the compositions listed in Table 1. In Table 1, the compositions of the non-aqueous organic solvents are indicated as volume ratios. EC represents ethylenecarbonate. DEC represents diethylcarbonate. EMC represents ethylmethylcarbonate. GBL represents gammabutyrolactone. GCL represents gammacaprolactone. GVL represents gammavalerolactone. GOL represents gammaoctanolactone. FEC represents monofluoroethylenecarbonate. PEGDA represents polyethyleneglycoldiacrylate as a gel-forming compound.

TABLE 1

| | Non-aqueous organic solvent (volume %) | | | | | | Electrolytic salt | | |
| --- | --- | --- | --- | --- | --- | --- | --- | --- | --- |
| | EC | DEC | GBL | GCL | GVL | GOL | LiPF$_6$ | LiBF$_4$ | Additive |
| Comp. Ex. 1 | 30 | 70 | — | — | — | — | 1.3 M | — | — |
| Comp. Ex. 2 | 30 | — | 70 | — | — | — | 1.3 M | — | — |
| Comp. Ex. 3 | 30 | 40 | 30 | — | — | — | 1.3 M | — | — |
| Ex. 1 | 30 | — | — | 70 | — | — | 1.3 M | — | — |
| Ex. 2 | 30 | — | — | — | 70 | — | 1.3 M | — | — |
| Ex. 3 | 30 | 40 | — | 30 | — | — | 1.3 M | — | — |
| Ex. 4 | 30 | 40 | — | — | 30 | — | 1.3 M | — | — |
| Ex. 5 | 30 | 40 | 28 | 2 | — | — | 1.3 M | — | — |
| Ex. 6 | 30 | 40 | 28 | — | 2 | — | 1.3 M | — | — |
| Ex. 7 | 30 | 40 | 30 | — | — | — | 1.3 M | — | FEC 2 volume % |
| Ex. 8 | 30 | 40 | 30 | 3 | — | — | 1.3 M | — | — |
| Ex. 9 | 30 | 40 | 30 | — | 3 | — | 1.3 M | — | — |
| Ex. 10 | 30 | 40 | 30 | 3 | — | — | 1.3 M | 0.03 M | — |
| Ex. 11 | 30 | 40 | 30 | — | 3 | — | 1.3 M | 0.03 M | — |
| Ex. 12 | 30 | 40 | 30 | 3 | — | — | 1.3 M | — | PEGDA 3 wt % |
| Ex. 13 | 30 | 40 | 30 | — | 3 | — | 1.3 M | — | PEGDA 3 wt % |
| Ex. 14 | 30 | 40 | — | — | — | 30 | 1.3 M | — | — |
| Ex. 15 | 30 | 40 | 28 | — | — | 3 | 1.3 M | — | — |

In each of the Examples and Comparative Examples, carbon black was added to a positive active material comprising lithium cobalt oxide (LiCoO$_2$) to provide a mixture. Fluorinated polyvinylidene was dissolved in an N-methylpyrrolidone solution. The mixture was combined with the N-methylpyrrolidone solution to provide a slurry, and the slurry was coated on an Al-foil current collector with a doctor blade. The slurry-coated Al foil was dried and cut to a rectangular shape to provide a positive electrode.

Styrene-butadiene rubber and sodium carboxymethyl cellulose were then dispersed in water, and artificial graphite was added to the water to provide a slurry. The slurry was then coated on a Cu foil current collector by a doctor blade. The slurry-coated Cu foil was dried and cut to a rectangular shape to provide a negative electrode.

A polypropylene porous separator was positioned between the positive electrode and the negative electrode, and the positive electrode, negative electrode and separator were then wound to provide a small cell, and inserted into an Al-laminated cell container. A predetermined amount of each electrolyte of Examples 1 to 15 and Comparative Examples 1 to 3 was injected into a separate cell container. After injection, the cell container was sealed and allowed to stand for 24 hours, thereby providing lithium secondary cells according to Examples 1 to 15 and Comparative Examples 1 to 3. Each aluminum laminated cell was 3.8 mm thick, 35 mm wide, and 62 mm high. The designated capacity of each cell was 800 mAh.

Experiment 1

Profile of Coulomb Efficiency

Figure 2:
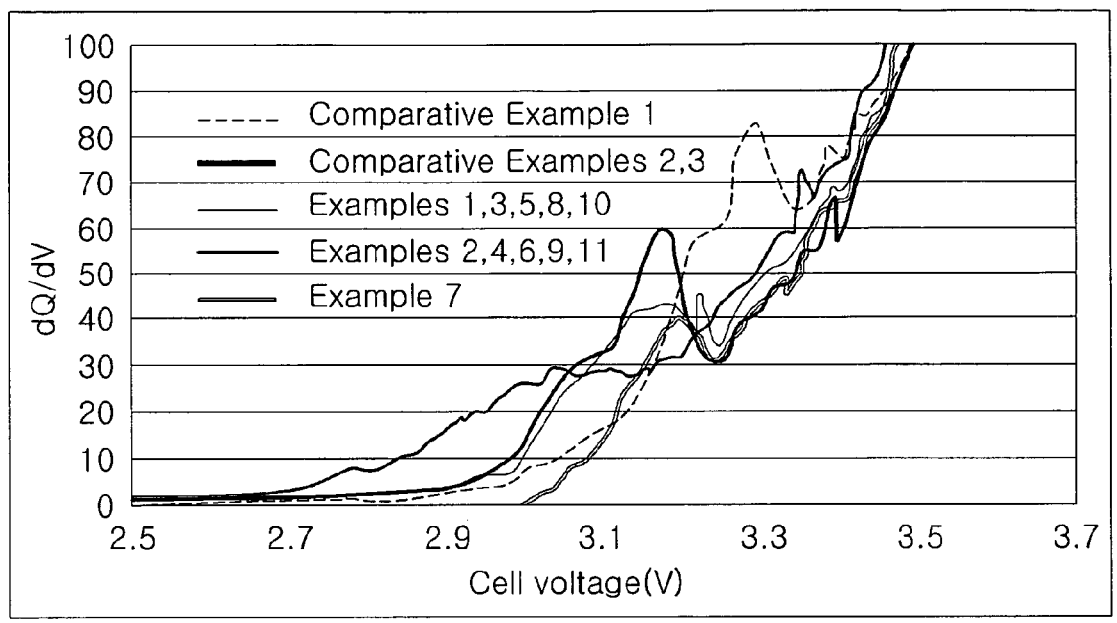
FIG. 2 is a graph comparing the coulomb efficiency of the organic solvents used in preparing the electrolytes according to Examples 1-11 and Comparative Examples 1-3.

FIG. 2 is a graph comparing the coulomb efficiency upon initial charging of the organic solvents used in preparing the electrolytes according to Examples 1-11 and Comparative Examples 1-3.

As shown in FIG. 2, GBL (gamma-butyrolactone), GVL (gamma-valerolactone), and GCL (gamma-caprolactone) form passivation films on the negative electrode of the lithium ion battery upon initial charging. These materials play an important role in lithium batteries. EC is used in Comparative Example 1, GBL in Comparative Examples 2 and 3, GCL in Examples 1, 3, 5, 8, 10, and 12, GVL in Examples 2, 4, 6, 9, and 11, and FEC in Example 7.

Experiment 2

Properties of Organic Solvent

Vaporization point, flash point, and heat of combustion of the organic solvent used in the electrolytes of Comparative Examples 1 to 3 and Examples 1 to 15 were measured. The results are shown in Table 2 below.

TABLE 2

| | Vaporization point (° C.) | Flash point (° C.) | Heat of Combustion (KJ/Kg) |
| --- | --- | --- | --- |
| EC | 243 | 160 | 14,695 |
| EMC | 93 | 24 | 19,780 |
| DEC | 126 | 31 | 21,114 |
| GBL | 205 | 98 | 24,110 |
| GCL | 219 | 98 | 31,072 |
| GVL | 210 | 100 | 29,870 |
| FEC | 250 | 122 | 10,672 |
| GOL | 215 | 110 | 36,209 |

Experiment 3

Evaluation of Battery Performance

The cycle-life characteristics at room temperature and at a high temperature (60° C.), overcharge inhibiting properties, and storage stability at a high temperature (80° C.) for Examples 1 to 7 and Comparative Examples 1 to 3 were measured. The results are shown in Table 3. The detailed method for measuring these battery characteristics is explained below.

The cycle-life characteristics at room temperature and at the high temperature were measured by repeating the charge and discharge. First, the battery was charged under constant current and constant voltage. Specifically, the battery was charged at 1 C under constant current until the voltage reached 4.2V, and then charged under constant voltage at 4.2V for 2 hours.

The battery cells were then discharged at a constant current. Specifically, the discharge was continued until the voltage reached 3.0V at 1 C. The capacity retention ratios at the 100th cycle are shown in Table 3. As used, "capacity retention ratio after the 100th cycle" means the ratio of the discharge capacity after repeating charge and discharge cycles 100 times to the discharge capacity after performing the first charge and discharge cycle.

The overcharge characteristics in the charge state were measured after charging to 4.2V at a 0.5 C constant current. The battery cells were then charged at a constant voltage of 4.2V for 2 hours, and allowed to stand at room temperature for 3 hours. The battery cells were then overcharged to 12V for 5 hours at a 2 A constant current.

The storage stability at the high temperature was measured by allowing the cells to stand in an autoclave oven at 80° C. for 5 days. The thicknesses of the cells were measured before the temperature decreased to obtain the rate of increase in cell thickness in relation to cell thickness before being placed in the autoclave oven.

The overcharge inhibiting characteristics were measured by charging the cells to 4.2V at a 0.5 C constant current. The cells were then discharged to 4.2V for 2 hours under constant voltage, and then allowed to stand at room temperature for 3 hours. The cells were then overcharged to 12V for 5 hours at a 2 A constant current.

TABLE 3

| | Capacity retention ratio after the 100th cycle (%) | Rate of increase in cell thickness after standing at 80° C. for 5 days (%) | Overcharge inhibiting characteristics in the charge state (2 A, 12 V) |
|---|---|---|---|
| Comp. Ex. 1 | 97 | 23 | Explosion |
| Comp. Ex. 2 | 30 | 270 | No explosion |
| Comp. Ex. 3 | 32 | 180 | No explosion |
| Ex. 1 | 88 | 2 | No explosion |
| Ex. 2 | 85 | 5 | No explosion |
| Ex. 3 | 95 | 4 | No explosion |
| Ex. 4 | 94 | 7 | No explosion |
| Ex. 5 | 94 | 3 | No explosion |
| Ex. 6 | 95 | 6 | No explosion |
| Ex. 7 | 92 | 38 | No explosion |
| Ex. 8 | 94 | 16 | No explosion |
| Ex. 9 | 94 | 15 | No explosion |
| Ex. 10 | 95 | 2 | No explosion |
| Ex. 11 | 94 | 3 | No explosion |
| Ex. 12 | 95 | 0 | No explosion |
| Ex. 13 | 92 | 1 | No explosion |
| Ex. 14 | 90 | 8 | No explosion |
| Ex. 15 | 93 | 3 | No explosion |

As shown in Table 3, Comparative Example 1 having an EC passivation film on the negative electrode exhibited good cycle-life characteristics but exploded at overcharge. This explosion results from use of 70 volume % of the DEC solvent, which has a high heat of combustion and a low flash point and which generates exothermic heat at overcharge. Comparative Examples 2 and 3 used 70 to 100 volume % of the EC and GBL solvents, which have high heats of combustion and low flash points, which are slightly better than DEC, and therefore no explosion at overcharge occurred. However, cycle-life characteristics deteriorated. This result indicates that the passivation films of Comparative Examples 2 and 3 are not suitable for lithium ion secondary batteries where continuous charge-discharge occurs.

Examples 1, 3, 5, 8, 10, and 12 used GCL to form the passivation film, Examples 2, 4, 6, 9, and 11 used GVL to form the passivation film, and Example 7 used FEC to form the passivation film. In each of these Examples, no explosions at overcharge occurred and the cycle-life characteristics and high temperature storage stability were significantly improved compared to Comparative Examples 2 and 3. This suggests that GVL and GCL can be used as flame-retardant solvents. Specifically, the electrolytes of Examples 1 and 2 can form passivation films having good heat-resistance and durability, and heats of combustion and flash points suitable for lithium ion secondary batteries.

Because Examples 3 to 13 used 40 volume % of DEC having a low dielectric constant, electrolytes according to these examples had decreased viscosities resulting in improved cycle-life performance of the batteries.

Examples 10 and 11 used two electrolyte salts and exhibited improved storage stability at high temperatures. The batteries according to these examples also exhibited improved heat-resistance and durability.

Examples 12 and 13 used electrolytes which included gel-forming compounds, and the batteries according to these examples exhibited improved heat-resistance and durability.

The electrolytes of the present invention for lithium secondary batteries generally comprise a non-aqueous organic solvent and a lactone-based compound, wherein the lactone-based compound comprises substituents selected from the group consisting of alkyl groups, alkenyl groups, alkynyl groups, aryl groups, and combinations thereof. These electrolytes improve battery safety at overcharge and improve cycle-life characteristics at room temperature and at high temperatures.

Lithium secondary batteries can be power sources for many types of electrical devices, for example, portable telephones, cellular phones, game machines, portable televisions, notebook computers, calculators, etc. However, lithium batteries are not limited to these uses. The secondary batteries of the present invention are useful as power sources for high power electric devices such as electric vehicles, hybrid electric vehicles, cordless vacuum cleaners, motorbikes, and motor scooters.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium secondary battery comprising
   a negative electrode capable of intercalating/deintercalating lithium,
   a positive electrode capable of intercalating/deintercalating lithium,
     wherein at least one of the positive and negative electrodes comprises an active material, a water-soluble polymer binder, and a water-soluble thickener, and
   an electrolyte comprising:
     a non-aqueous organic solvent comprising a cyclic carbonate and a lactone-based compound, wherein the lactone-based compound comprises at least one substituent selected from the group consisting of alkyl groups, alkenyl groups, alkynyl groups, aryl groups, and combinations thereof;
     at least one lithium salt; and
     a solvent having a viscosity less than 1 cps.

2. The lithium secondary battery of claim 1, wherein the positive electrode comprises at least one compound selected from the group consisting of compounds represented by the following formulas (1) to (14):

$Li_xMn_{1-y}M_yA_2$ (1);

$Li_xMn_{1-y}M_yO_{2-z}X_z$ (2);

$Li_xMn_2O_{4-z}X_z$ (3);

$Li_xMn_{2-y}M_yM'_zA_4$ (4);

$Li_xCo_{1-y}M_yA_2$ (5);

$Li_xCo_{1-y}M_yO_{2-z}X_z$ (6);

$Li_xNi_{1-y}M_yA_2$ (7);

$Li_xNi_{1-y}M_yO_{2-z}X_z$ (8);

$Li_xNi_{1-y}Co_yO_{2-z}X_z$ (9);

$Li_xNi_{1-y-z}Co_yM_zA_\alpha$ (10);

$Li_xNi_{1-y-z}Co_yM_zO_{2-\alpha}X_\alpha$ (11);

$Li_xNi_{1-y-z}Mn_yM_zA_\alpha$ (12);

$Li_xNi_{1-y-z}Mn_yM_zO_{2-\alpha}X_\alpha$ (13); and $Li_xMn_{2-y-z}M_yM'_zA_4$ (14), wherein $0.9 \leq x \leq 1.1$, $0 \leq y \leq 0.5$, $0 \leq z \leq 0.5$, and $0 \leq \alpha \leq 2$;

M and M' are each selected from the group consisting of Mg, Al, Co, K, Na, Ca, Si, Ti, Sn, V, Ge, Ga, B, As, Zr, Ni, Mn, Cr, Fe, Sr, V, and rare earth elements;

A is selected from the group consisting of O, F, S, and P; and

X is selected from the group consisting of F, S, and P.

3. The lithium secondary battery of claim 1, wherein the negative electrode comprises a carbonaceous material selected from the group consisting of artificial graphite, natural graphite, graphitized carbon fiber, graphitized mesocarbon microbeads, fullerene, amorphous carbon, and mixtures thereof.

4. The lithium secondary battery of claim 1, wherein the water-soluble polymer binder is selected from the group consisting of styrene-butadiene rubber (SBR), carboxy modified styrene-butadiene rubber (SBR), acrylonitrile-butadiene rubber (NBR), acrylate-butadiene rubber, sodium polyacrylate, copolymers of propylene and olefins having from 2 to 8 carbon atoms, copolymers of (meth)acrylic acid and alkyl (meth)acrylate, and mixtures thereof.

5. The lithium secondary battery of claim 1, wherein the water-soluble thickener comprises a cellulose-based compound.

6. The lithium secondary battery of claim 5, wherein the cellulose based compound is selected from the group consisting of a carboxymethyl cellulose-alkali metal salt, a hydroxypropylmethyl cellulose-alkali metal salt, and a methyl cellulose-alkali metal salt, and mixtures thereof.

7. The lithium secondary battery of claim 1, wherein the water-soluble thickener is selected from the group consisting of polyvinylalcohol, polyvinylpyrrolidone, polyacrylic acid, polymethacrylic acid, polyethyleneoxide, polyacrylamide, poly-N-isopropylacrylamide, poly-N,N-dimethylacrylamide, polyethyleneimine, polyoxyethylene, poly(2-methoxyethoxyethylene), poly(3-morphinylethylene), polyvinylsulfonic acid, polyvinylidene fluoride, amylose, poly (acrylamide-co-diallyldimethyl ammonium chloride), and mixtures thereof.

8. The lithium secondary battery of claim 1, wherein the water-soluble polymer binder is present in the electrolyte in an amount ranging from about 0.5 to about 10 wt % based on the total weight of the active material and binder.

9. The lithium secondary battery of claim 1, wherein the water-soluble polymer binder is present in the electrolyte in an amount ranging from about 0.1 to about 10 wt % based on the total weight of the active material and binder.

10. The lithium secondary battery of claim 1, wherein at least one of the positive and negative electrodes further comprises an electro-conductive agent.

11. The lithium secondary battery of claim 10, wherein the electro-conductive agent is selected from the group consisting of nickel powder, cobalt oxide, titanium oxide, and carbon materials.

12. The lithium secondary battery of claim 11, wherein the carbon materials are selected from the group consisting of ketjen black, acetylene black, furnace black, denka black, graphite, carbon fiber, fullerene, and mixtures thereof.

13. The lithium secondary battery of claim 1, wherein the cyclic carbonate is selected from the group consisting of ethylene carbonate, propylene carbonate, vinylene carbonate, butylene carbonate, and mixtures thereof.

14. The lithium secondary battery of claim 1, wherein the cyclic carbonate is present in the electrolyte in an amount up to 50 volume % based on the amount of the non-aqueous organic solvent.

15. The lithium secondary battery of claim 14, wherein the cyclic carbonate is present in the electrolyte in an amount ranging from about 5 volume % to about 30 volume % based on the amount of the non-aqueous organic solvent.

16. The lithium secondary battery of claim 15, wherein the cyclic carbonate is present in the electrolyte in an amount ranging from about 5 volume % to about 15 volume % based on the amount of the non-aqueous organic solvent.

17. The lithium secondary battery of claim 1, wherein the lactone-based compound is selected from the group consisting of beta-butyrolactone, gamma-valerolactone, gamma-caprolactone, gamma-heptanolactone, gamma-octanolactone, gamma-nonalactone, gamma-decanolactone, delta-caprolactone, delta-heptanolactone, delta-octanolactone, delta-nonalactone, delta-decanolactone, delta-dodecanolactone, and mixtures thereof.

18. The lithium secondary battery of claim 1, wherein the lactone-based compound is present in the electrolyte in an amount ranging from about 0.1 to about 80 volume % based on the amount of the non-aqueous organic solvent.

19. The lithium secondary battery of claim 18, wherein the lactone-based compound is present in the electrolyte in an amount ranging from about 0.5 to about 60 volume % based on the amount of the non-aqueous organic solvent.

20. The lithium secondary battery of claim 1, wherein the solvent having a viscosity less than 1 cps is present in an amount ranging from about 1 to about 50 volume % based on the amount of the non-aqueous organic solvent.

21. The lithium secondary battery of claim 1, wherein the solvent having a viscosity less than 1 cps is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), tetrahydrofuran, 2-methyl tetrahydrofuran, 1,4-dioxane, 1,2-dimethoxyethane, 1,2-diethoxyethane, acetonitrile, methyl propionate, dimethyl formamide, fluoroethers (fluorinated ethers), and mixtures thereof.

22. The lithium secondary battery of claim 21, wherein the fluoroether is selected from the group consisting of $HCF_2(CF_2)_3CH_2OCF_2CF_2H$, $CF_3CF_2CH_2OCF_2CFHCF_3$, $HCF_2CF_2CH_2OCF_2CF_2H$, $HCF_2CF_2CH_2OCF_2CFHCF_3$, $HCF_2(CF_2)_3CH_2OCF_2CFHCF_3$, and combinations thereof.

23. The lithium secondary battery of claim 1, wherein the at least one lithium salt is selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x+1}$SO$_2$)(C$_y$F$_{2y+1}$SO$_2$) where x and y are rational numbers, LiCl, LiI, and mixtures thereof.

24. The lithium secondary battery of claim 1, wherein the electrolyte further comprises an unsubstituted lactone-based compound.

25. The lithium secondary battery of claim 24, wherein the unsubstituted lactone-based compound is selected from the group consisting of β-propiolactone, γ-butyrolactone, δ-valerolactone, ∈-caprolactone, and mixtures thereof.

26. The lithium secondary battery of claim 24, wherein the unsubstituted lactone-based compound is present in the electrolyte in an amount ranging from about 1 volume % to about 60 volume % based on the amount of the non-aqueous organic solvent.

27. The lithium secondary battery of claim 1, wherein the electrolyte further comprises an ester compound having an electron withdrawing group, and further wherein the at least one lithium salt comprises at least two lithium salts, wherein one of the lithium salts is lithium tetrafluoroborate (LiBF$_4$).

28. The lithium secondary battery of claim 1, wherein the electrolyte further comprises a gel-forming compound.

29. The lithium secondary battery of claim 1, wherein the electrolyte has a dielectric constant ranging from about 20 to about 60.

30. The lithium secondary battery of claim 1, wherein the water-soluble thickener is present in the active material in an amount ranging from about 0.1 to about 10 wt %, based on the total weight of the active material and binder.

31. The lithium secondary battery of claim 1, wherein the concentration of the lithium salt ranges from about 0.1 mol/L to about 2.0 mol/L.

32. The lithium secondary battery of claim 1, wherein the lactone-based compound is selected from the group consisting of compounds represented by the following formulas (15) to (17):

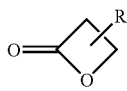

(15)

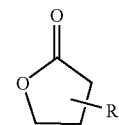

(16)

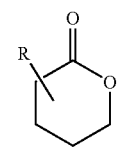

(17)

wherein R is selected from the group consisting of alkyl groups, alkenyl groups, alkynyl groups, aryl groups, and combinations thereof.

33. A lithium secondary battery comprising
a negative electrode capable of intercalating/deintercalating lithium,
a positive electrode capable of intercalating/deintercalating lithium,
   wherein at least one of the positive and negative electrodes comprises an active material, a water-soluble polymer binder, and a water-soluble thickener, and
an electrolyte comprising:
   a non-aqueous organic solvent comprising a cyclic carbonate and a lactone-based compound, wherein the lactone-based compound comprises at least one substituent selected from the group consisting of alkyl groups, alkenyl groups, alkynyl groups, aryl groups, and combinations thereof;
   at least one lithium salt; and
   an ester compound having an electron withdrawing group.

34. The lithium secondary battery of claim 33, wherein the ester compound is selected from the group consisting of ethylene carbonate derivatives of the following formula (18):

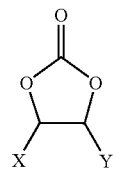

(18)

wherein X and Y each comprise an electron withdrawing group.

35. The lithium secondary battery of claim 34, wherein at least one of X and Y comprises an electron withdrawing group selected from the group consisting of hydrogen, halogen, cyano (CN), and nitro (NO$_2$).

36. The lithium secondary battery of claim 34, wherein the ethylene carbonate derivative is selected from the group consisting of fluoroethylenecarbonate, difluoroethylenecarbonate, fluoropropylenecarbonate, difluoropropylenecarbonate, trifluoropropylenecarbonate, fluorogammabutyrolactone, difluorogammabutyrolactone, chloroethylenecarbonate, dichloroethylenecarbonate, chloropropylenecarbonate, dichloropropylenecarbonate, trichloropropylenecarbonate, chlorogammabutyrolactone, dichlorogammabutyrolactone, bromoethylenecarbonate, dibromoethylenecarbonate, bromopropylenecarbonate, dibromopropylenecarbonate, tribromopropylenecarbonate, bromogammabutyrolactone, dibromogammabutyrolactone, nitroethylenecarbonate, nitropropylenecarbonate, nitrogammabutyrolactone, cyanoethylenecarbonate, cyanopropylenecarbonate, cyanogammabutyrolactone, and mixtures thereof.

37. The lithium secondary battery of claim 34, wherein the ester compound is present in the electrolyte in an amount ranging from about 0.1 wt % to about 25 wt %.

* * * * *

UNITED STATES PATENT AND TRADEMARK OFFICE
CERTIFICATE OF CORRECTION

| | | |
|---|---|---|
| PATENT NO. | : 7,846,588 B2 | |
| APPLICATION NO. | : 11/174075 | |
| DATED | : December 7, 2010 | |
| INVENTOR(S) | : Cheol-Soo Jung et al. | |

It is certified that error appears in the above-identified patent and that said Letters Patent is hereby corrected as shown below:

In the Claims

Column 18, Claim 35, line 37    Delete "least one ofX and Y"
                                Insert -- least one of X and Y --

Signed and Sealed this
Fifteenth Day of November, 2011

David J. Kappos
*Director of the United States Patent and Trademark Office*